March 23, 1943.   F. HANSHAW   2,314,700

FOWL PICKER

Filed June 6, 1941

INVENTOR
Fred Hanshaw.
BY
Harness, Dickey & Pierce.
ATTORNEYS.

Patented Mar. 23, 1943

2,314,700

UNITED STATES PATENT OFFICE 2,314,700

FOWL PICKER

Fred Hanshaw, Port Huron, Mich.

Application June 6, 1941, Serial No. 396,796

9 Claims. (Cl. 17—11.1)

The invention relates to butchering and it has particular relation to devices for picking fowls or the like.

In commercial operations especially, it is of considerable importance in the handling of fowl that the feathers be removed thoroughly in order to satisfy the customer and that they be removed rapidly and efficiently in order to reduce the cost of operations as much as possible. While devices have been provided for mechanically picking feathers from fowls, these have been objectionable either in that a satisfactory picking operation was not obtained or that the operation was not performed with sufficient rapidity or efficiency or that the mechanism was too expensive. In so far as known at least, no mechanical feather picker has been available at small cost to the small commercial operator, which would perform the picking operations rapidly, efficiently, and with minimum effort.

One object of the present invention is to provide a mechanical device for picking feathers from frowls which will perform a thorough picking operation with rapidity and which is inexpensive to manufacture, operate, and maintain.

Another object of the invention is to provide a device of this character which requires minimum effort on the part of the operator so that the operation is neither tedious or laborious.

Other objects of the invention will become apparent from the following specification, from the drawing relating thereto, and from the claims hereinafter set forth.

For a better understanding of the invention, reference may be had to the drawing, wherein.

Figure 1:
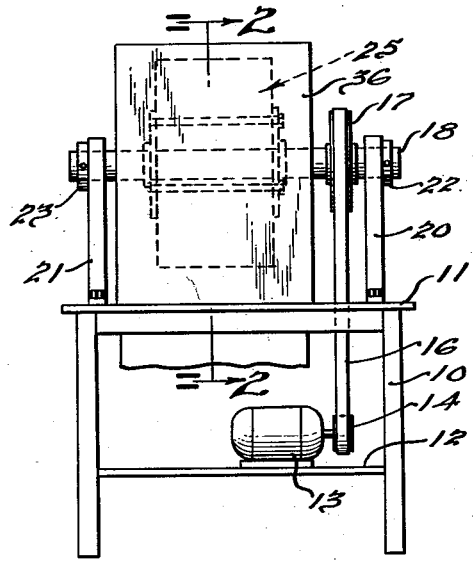
Figure 1 is an elevational view of fowl picking mechanism constructed according to one form of the invention.
Figure 2:
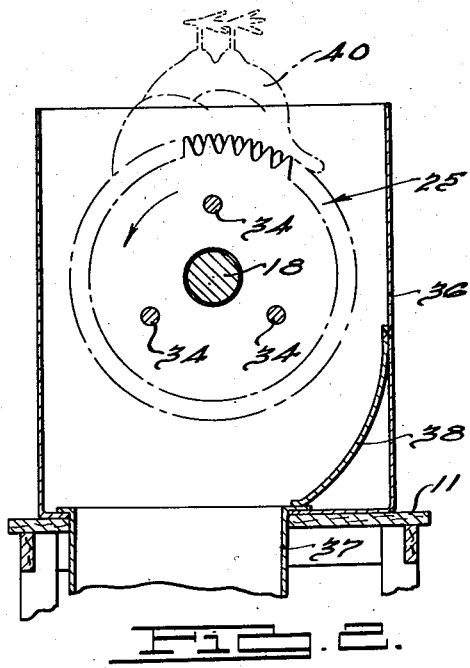
Fig. 2 is a cross-sectional view taken substantially along the line 2—2 of Fig. 1.

Referring to Figs. 1 and 2, the machine illustrated includes a frame 10 having a top 11 and a motor support 12 adapted to support a motor 13. This motor has a pulley 14 on its shaft which engages a belt 16, which, in turn, is trained about a pulley 17 keyed to a shaft 18. The shaft is supported in bearing brackets 20 and 21 and may be retained against endwise movement by collars 22 and 23.

Figure 4:
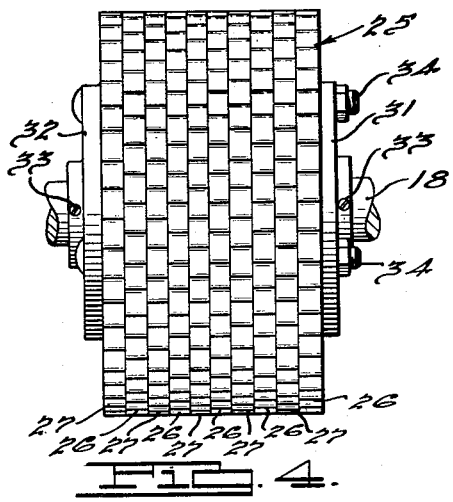
Fig. 4 is a view of the rotary picking member as seen when removed from the framework.

Between the bearing brackets 20 and 21, a feather picking member 25 is mounted on the shaft and generally this member is in the form of a drum, or, in other words, generally is of drum shape. The member 25 comprises a series of discs (Fig. 4) 26 and 27 arranged in side by side relation axially of the shaft and each disc is composed of sponge rubber of suitable character, such, for example, as has been used in chair pads or cushions for chairs. This sponge rubber does not have undesirably large air cells although it is to be understood that the particular character of the sponge rubber may vary.

Figure 3:
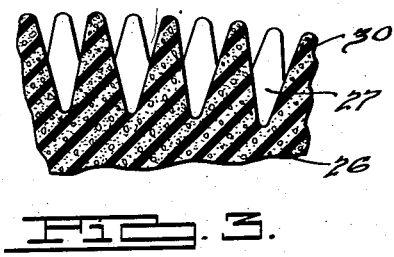
Fig. 3 is an enlarged, fragmentary and sectional view from a plane passed through one circular row of the teeth on the rotary picker.

As best shown by Fig. 3, each of the discs 26 and 27 is provided with teeth 30 generally of V shape and which are of sufficient height compared to their circumferential dimensions as to provide desired flexibility and side surfaces of sufficient area adapted to contact the fowl to be picked. The teeth on the discs 27 are disposed circumferentially between the teeth on the discs 26 so that all of the teeth on the discs 27 are arranged in axial rows with such rows circumferentially alternating with the rows of teeth on the discs 26. Preferably, the apices of the teeth are rounded as shown and the troughs similarly are rounded.

For holding the discs together, end plates 31 and 32 are provided on the shaft 18 and are drivingly locked thereto in any suitable manner, such as by set screws 33, and these end plates are interconnected by axially extending bolts 34. It has been mentioned that the end plates are drivingly connected to the shaft and hence the bolts hold the discs in their proper positions and drivingly connect them to the end plates and hence to the shaft.

A casing 36 is disposed on the table 11 and includes side and end walls extending above and below the drum member 25, but the casing is open at its upper end to allow the operator to place the fowl against the periphery of the drum. At its lower end, the casing is connected to a discharge conduit 37 by means of which feathers and water may be discharged from the casing. A baffle plate 38 may be provided if desired to facilitate dropping of the feathers into the duct 37. The drum member may be rotated at a fair rotary speed of several hundred revolutions per minute, although this may be varied as desired, and a suitable switch may be placed adjacent the machine, by means of which the operator may control its operation.

Assuming that a chicken has been properly scalded, it is placed on the upper surface of the rotary member 25, as generally indicated at 40, and is held in position by the hands of the operator. It is moved as required to bring the different surfaces of the chicken into contact with the drum so that the feathers will be completely removed. As the chicken is pressed downwardly against the teeth on the discs of the rotary member, such teeth wipingly pull the feathers from the chicken and they generally become deposited beneath the member. Since the discs are made of sponge rubber, they are very resilient, and the teeth being flexible as well as resilient, it is very easy to bring the rubber into close contact with all surface parts of the chicken almost regardless of irregularities in body contour. Hence, any part of the chicken may be pressed against the drum and the feathers even in recesses will be pulled out by teeth which will project into the recesses. It is not a difficult operation to hold a chicken in different positions against the drum and only light pressure is necessary and there is no danger of the operator becoming injured in any way, due to the softness of the rotating material. By having the teeth arranged irregularly or distributing the teeth in the manner described and shown, the forces involved are more uniformly distributed with respect to rotary movement of the member. Thus, a smoother and non-jerky operation is obtainable. Also, by having the teeth distributed as stated, a more efficient contact can be obtained with the body of the chicken.

The mechanism can be manufactured at very little expense, as will be readily appreciated by anyone skilled in the art. Furthermore, and due to the simplicity of the machine and the small number of parts, it is a simple matter to maintain the machine in working order and to make any repairs whenever necessary. In particular, by having the drum constructed of separated discs, it is a simple matter to make replacements in the event one or more teeth should accidentally be torn off and it follows that this would be inexpensive as compared to replacing an entire drum. Moreover, it is simpler to manufacture separate discs with similar teeth and then arrange them to displace the teeth of one disc circumferentially with respect to adjacent discs, and then retain them in this relation by means of the connecting bolts. These discs may be molded to the shape shown or they may be manufactured by cutting them from slabs or blocks of sponge rubber. Altogether, the machine has proven to be very inexpensive to manufacture and it performs a thorough fowl picking operation with great rapidity.

Although more than one form of the invention has been described and illustrated in detail, it will be apparent those skilled in the art that various modifications may be made without departing from the scope of the appended claims.

What is claimed is:

1. A fowl picker comprising a rotatable drum-shape member having sponge rubber teeth on its periphery with the teeth arranged in irregular lines axially of the member, and means for rotating the member.

2. A fowl picker comprising a rotatable drum-shape member having sponge rubber teeth on its periphery with the teeth so arranged that axially adjacent teeth are circumferentially displaced relative to each other, and means for rotating the member.

3. A fowl picker comprising a rotatable drum-shape member having sponge rubber teeth on its periphery with the teeth arranged in annular rows and with the teeth in axially adjacent rows displaced circumferentially with respect to each other, and means for rotating the member.

4. A fowl picker comprising a rotatable drum-shape member including a series of discs disposed in side-by-side relation, sponge rubber teeth on the periphery of each disc, means holding the discs together, and means for rotating the member.

5. A fowl picker comprising a rotatable drum-shape member including a series of discs disposed in side-by-side relation, sponge rubber teeth on the periphery of each disc, with the teeth on certain discs displaced circumferentially with respect to the teeth on other discs, and means for rotating the member.

6. A fowl picker comprising a rotatable drum shape member including a series of sponge rubber discs disposed in side by side relation, teeth on each disc with the teeth on certain discs displaced circumferentially with respect to other discs, means holding the discs together, and means for rotating the discs.

7. A fowl picker comprising a movable member having sponge rubber teeth or projections adapted to wipingly remove feathers from the fowl, and means for rapidly moving the member so that with a fowl in contact therewith, the feathers will be removed.

8. A fowl picker comprising a movable member having sponge rubber teeth or projections adapted to wipingly remove feathers from the fowl, and means for rapidly moving the member so that with a fowl in contact therewith, the feathers will be removed, said projections being so distributed over the surface of the member that the forces required in moving the member during the picking operation will generally be uniform.

9. A fowl picker comprising a rotary drum-like member including a shaft, an axially arranged series of sponge rubber discs on the shaft, means extending axially through the discs inwardly of their outer periphery for drivingly connecting them to each other, means drivingly connecting the member to the shaft, teeth on each of the discs, the teeth on certain discs being displaced circumferentially with respect to the teeth on other discs, and means for rotating the shaft.

FRED HANSHAW.